BALL & POST
Cultivator.
No. 8,850.  Patented Apr. 6, 1852.
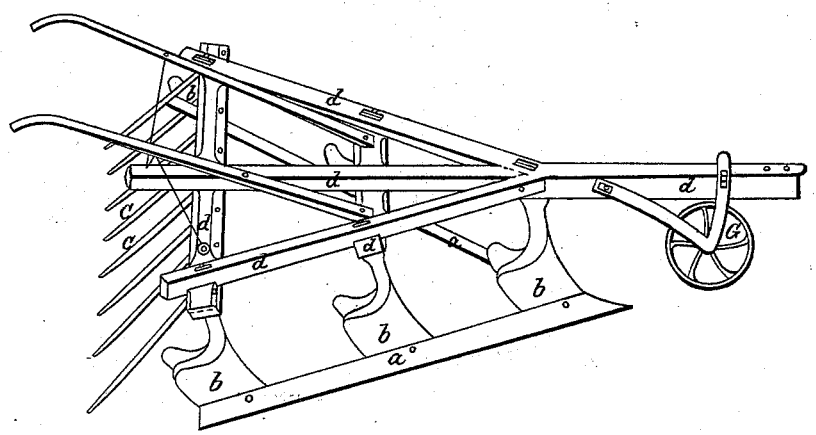

UNITED STATES PATENT OFFICE.

THADDEUS J. BALL AND JOHN POST, OF PITTSFIELD, MICHIGAN.

IMPROVEMENT IN CULTIVATORS.

Specification forming part of Letters Patent No. 8,850, dated April 6, 1852.

*To all whom it may concern:*

Be it known that we, T. J. BALL and JOHN POST, both of Pittsfield, Washtenaw county, and State of Michigan, have invented a new agricultural implement which we call the "Share and Tooth Cultivator," both for a double and also for a single cultivator, as represented by the drawing accompanying this description; and we do hereby declare that the following is a full and correct description thereof, reference being had to the diagram accompanying this description and the letters made thereon.

The nature of our invention consists in the construction and application of long metallic shares $a\ a\ a$, extending the entire length on both sides of the cultivator, being united at the point and sharpened on the lower edge in order to cut the grass and weeds, and thereby facilitate the motion of the implement through the ground, moving at the same time the entire surface of the ground. These shares are bolted to the metallic mold-boards $b\ b\ b$. Connected to the after part of the cultivator is an inclined, metallic-blade rake, $v\ C\ C\ C$, the object of which is to pulverize the ground and make it fine and mellow. This rake may be elevated or let down according to circumstances. We construct the metallic mold-boards $b\ b\ b$ with a shank at the top, which goes through the wood-work $d\ d$, with a nut on the top for the double cultivator, and bolted to the handles for the single cultivator.

$d\ d$ represent on the diagram the wood-work; $f\ f$, the handles.

What we claim as our invention, and desire to secure by Letters Patent, is—

The construction of the long metallic inclined blades $e\ e\ e$ on the after part of the machine for cutting the sods and lumps and pulverizing the ground, as set forth.

T. J. BALL.
JOHN POST.

In presence of—
JAMES S. HILL,
T. L. HUMPHREVILLE.